US007085955B2

(12) United States Patent
Prabhu

(10) Patent No.: US 7,085,955 B2
(45) Date of Patent: Aug. 1, 2006

(54) CHECKPOINTING WITH A WRITE BACK CONTROLLER

(75) Inventor: Manohar Karkal Prabhu, Pal Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 930 days.

(21) Appl. No.: 10/106,723

(22) Filed: Mar. 25, 2002

(65) Prior Publication Data

US 2003/0056143 A1 Mar. 20, 2003

Related U.S. Application Data

(63) Continuation-in-part of application No. 09/952,994, filed on Sep. 14, 2001.

(51) Int. Cl.
*G06F 11/00* (2006.01)
(52) U.S. Cl. ............... 714/6; 714/15; 714/16; 714/18; 714/20; 711/143
(58) Field of Classification Search .............. 714/6, 714/15, 16, 18, 20; 717/161, 162; 711/143
See application file for complete search history.

(56) References Cited

U.S. PATENT DOCUMENTS

| 3,736,566 A | * | 5/1973 | Anderson et al. ............. 714/15 |
| 5,745,672 A | * | 4/1998 | Stiffler ........................... 714/6 |
| 5,933,593 A | * | 8/1999 | Arun et al. .................... 714/6 |
| 6,079,030 A | * | 6/2000 | Masubuchi ................... 714/15 |
| 6,779,087 B1 | * | 8/2004 | Saulsbury et al. .......... 711/143 |
| 6,810,489 B1 | * | 10/2004 | Zhang et al. ................... 714/6 |

* cited by examiner

*Primary Examiner*—Robert Beausoliel
*Assistant Examiner*—Emerson Puente

(57) ABSTRACT

A checkpointing method and system that utilize a write back controller. The system can include a first controller for implementing a first function, wherein the first function comprises part of a checkpoint operation and wherein the checkpoint operation comprises a series of contiguous checkpoint cycles. The system can also include a second controller, the second controller for implementing a second function, wherein the second function comprises a write back operation from a first memory location to a second memory location and wherein the write back operation occurs before a checkpoint cycle ends. Information already at the second memory location can be selectively written back to a third memory location.

35 Claims, 8 Drawing Sheets

| Course of Action to Be Used if Necessary | Flag 390 Used? | Flag 390 Indication | Write Back Strategy |
|---|---|---|---|
| Allocate more pointer memory | Yes | Have all pointers | Use list 310 - no pointers 320 lost |
| | Yes | Don't have all pointers | Use list 310 and scan memory locations for data requiring cleaning |
| | No | N/A | Use list 310 and scan memory locations for data requiring cleaning |
| High priority write back | N/A | N/A | Use list 310 - no pointers 320 lost |
| Forget incoming pointer(s) | Yes | Have all pointers | Use list 310 - no pointers 320 lost |
| | Yes | Don't have all pointers | Use list 310 and scan memory locations for data requiring cleaning |
| | No | N/A | Use list 310 and scan memory locations for data requiring cleaning |
| Overwrite pointer(s) | Yes | Have all pointers | Use list 310 - no pointers 320 lost |
| | Yes | Don't have all pointers | Use list 310 and scan memory locations for data requiring cleaning |
| | No | N/A | Use list 310 and scan memory locations for data requiring cleaning |

(N/A = Not applicable)

Figure 3B

CHECKPOINTING WITH A WRITE BACK CONTROLLER

CROSS REFERENCE TO RELATED APPLICATION

This Application is a Continuation-in-Part of the co-pending, commonly owned U.S. patent application, Ser. No. 09/952,994, filed Sep. 14, 2001, by Manohar K. Prabhu, and entitled "Preemptive Write Back Controller."

FIELD OF THE INVENTION

Embodiments of the present invention generally relate to computer systems. More particularly, embodiments of the present invention relate to computer systems that utilize checkpointing.

BACKGROUND ART

A cache, main memory, or other temporarily private data storage generally implements a particular write policy or strategy. "Temporarily private data storage" refers to a component of a computer system that temporarily maintains some particular data in a private state (e.g., some portion of the computer system can see particular data while another portion of the computer system cannot see that data). Subsequently, the particular data can be made available to another portion of the computer system. A scratch pad memory of a processor is an example of temporarily private data storage.

Examples of write strategies include a write through strategy and a write back strategy. The simplest case is the write through strategy. In a write through cache, a write operation from the processor leads to the transfer of the data to the next level in a memory hierarchy, even with a cache hit. Moreover, an entry in the write through cache is written to and updated.

In a write back cache, on a write operation from the processor, only the entry (on a cache hit) in the write back cache is written to and updated while the content of another level of memory (e.g., the next level of memory or the main memory) remains unaltered. A "dirty" entry refers to an entry (e.g., a line or page) that has been written to and updated but has not yet been updated in another level of memory. A dirty cache entry is subsequently copied to the main memory or to another level of memory in order to update the content there.

Generally, dirty cache entries are copied to the main memory or another level of memory after an explicit instruction to clean (or flush) the write back cache, or in certain cases of capacity, conflict, or coherence misses. Some fault-tolerant computer systems cleanse cache memories of dirty lines as part of a checkpoint process. In a checkpoint process, the state of the computer system is periodically recorded (stored) at checkpoint boundaries. In the event of a fault, the computer system can backtrack to a previous state that existed prior to the fault, thereby losing only the time invested between the most recent checkpoint boundary and the time that the fault occurred.

Accordingly, information sufficient to restore the computer system to a state equivalent to the state that existed prior to the fault is typically stored (for example, a state at which the computer system can satisfactorily restart computation without including incorrect execution, data or the like). One method of accomplishing this is to cleanse the cache memory of dirty lines at each checkpoint boundary. The dirty lines can be written back to main memory and thereby preserved.

A problem in the prior art is that cache flushing at a checkpoint boundary may cause parts of the computer system to operate above an optimum or maximum threshold of utilization. For example, at the time of the checkpointing operation, the memory bus may become saturated or may operate at a capacity greater than that which is optimal. This in turn may lead to bottlenecks and excessive queuing of requested operations, thereby increasing latency and stall time of instruction execution.

Thus, what is needed is a method and/or system that can alleviate the impact of the checkpoint process on computer system resources.

SUMMARY OF THE INVENTION

Embodiments of the present invention pertain to a checkpointing method and system that utilize a write back controller. In one embodiment, the system includes a first controller for implementing a first function, wherein the first function comprises part of a checkpoint operation and wherein the checkpoint operation comprises a series of contiguous checkpoint cycles. In this embodiment, the system also includes a second controller coupled to the first controller, the second controller for implementing a second function, wherein the second function comprises a write back operation from a first memory location to a second memory location and wherein the write back operation occurs before a checkpoint cycle ends. According to the present embodiment, information already at the second memory location is selectively written back to a third memory location.

BRIEF DESCRIPTION OF THE DRAWINGS

The accompanying drawings, which are incorporated in and form a part of this specification, illustrate embodiments of the invention and, together with the description, serve to explain the principles of the present invention.

FIG. 3B is a table summarizing actions that may be performed by a write back controller according to various embodiments of the present invention.

The drawings referred to in this description should not be understood as being drawn to scale except if specifically noted.

DETAILED DESCRIPTION OF THE INVENTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. In other instances, well known methods, procedures, components, and circuits have not been described in detail as not to unnecessarily obscure aspects of the present invention.

Write Back Controller

Figure 1:
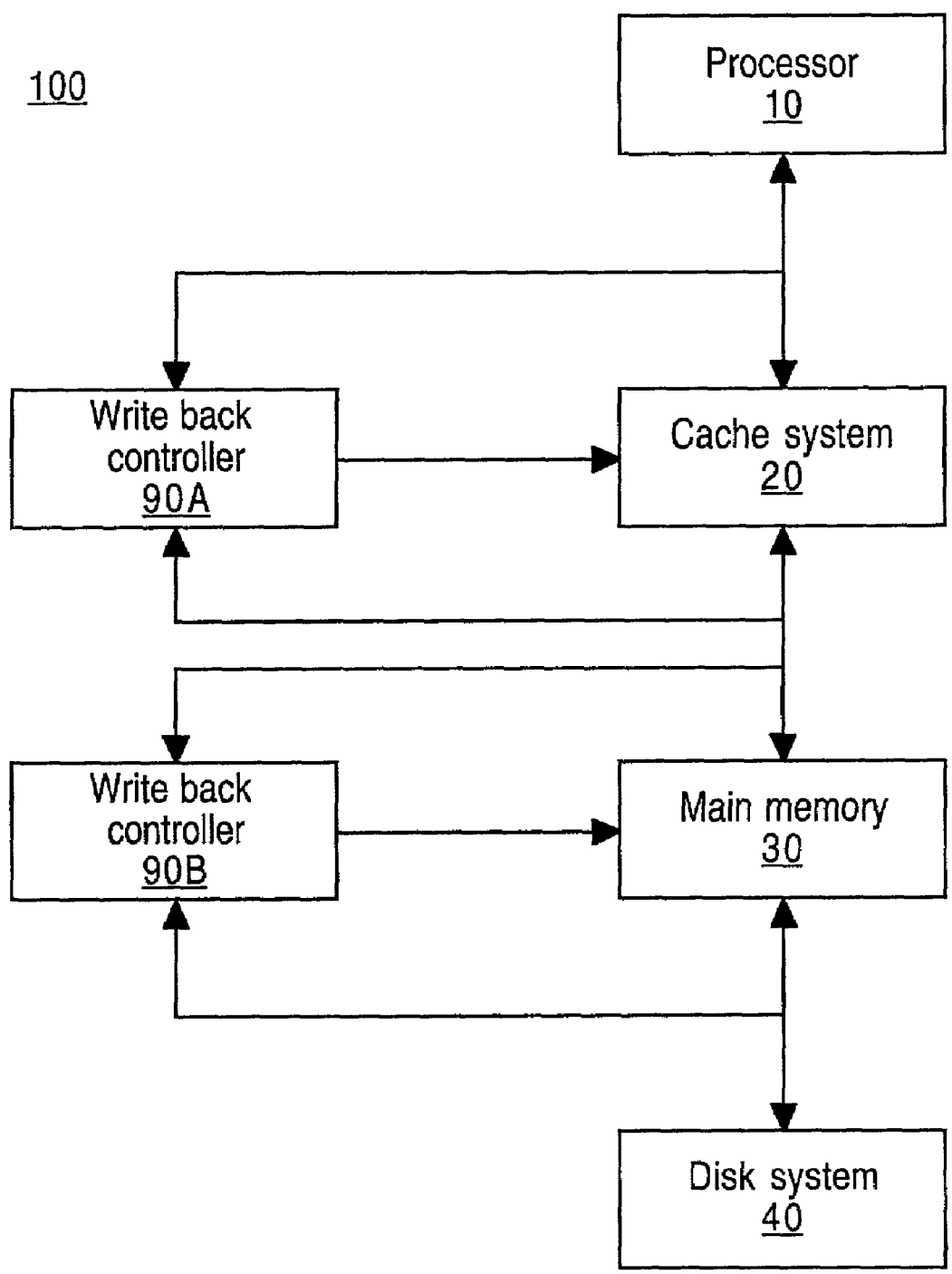
FIG. 1 is a block diagram of a first computer system, showing a write back controller in accordance with one embodiment of the present invention.

FIG. 1 illustrates a first computer system 100, showing a write back controller 90A and 90B in accordance with one embodiment of the present invention. In this embodiment, the first computer system 100 includes a processor 10, a cache system 20, a main memory 30, and a disk system 40, coupled using one or more buses. The cache system 20 can be a multiple-level cache system having a plurality of cache levels such as a level 1 cache, a level 2 cache, a level 3 cache, etc. Alternatively, the cache system 20 can be a single-level cache system having a cache. It will be understood that the first computer system 100 can be configured in any other manner. Although the present invention is described in the context of cache system 20 and main memory 30, the present invention is well suited for use with other temporarily private data storages that implement a write back strategy. The present invention is also well suited for use with a write through strategy, as long as at least one of the memories coupled to a write back controller utilizes a write back strategy.

In the present embodiment, first computer system 100 includes a first write back controller 90A coupled to the cache system 20 and a second write back controller 90B coupled to the main memory 30. According to the present embodiment of the present invention, the first write back controller 90A is designed and optimized for operation with the cache system 20 while the second write back controller 90B is designed and optimized for operation with the main memory 30. It will be understood that the first computer system 100 can have a write back controller for each level of the cache system 20.

In the present embodiment, a level 1 cache writes back to a level 2 cache, the level 2 cache writes back to the main memory 30, and the main memory 30 writes back to the disk system 40. In an embodiment in which cache system 20 includes additional levels of caches, the level 2 cache can write back to a level 3 cache, the level 3 cache can write back to another level of cache, and so on, with the final level of cache writing back to the main memory 30. In an alternate embodiment, any level of the cache system 20 or main memory 30 or other temporarily private data storage may utilize a write through strategy, as long as at least one of the memories coupled to a write back controller utilizes a write back strategy. In another embodiment, the cache system 20 simply writes back to the main memory 30. It should be understood that a write back controller does not have to be implemented with each of the memories of the computer system 100. Moreover, the processor 10 can bypass the cache system 20 and interact directly with the main memory 30 or any other memory system.

The write back controllers 90A and 90B preemptively initiate the cleaning of the cache system 20 and the main memory 30 in advance of an immediate requirement to do so (e.g., in advance of a synchronization operation, a check-pointing operation, a context switch, a page fault or page replacement, etc.). In various embodiments, write back controllers 90A and 90B utilize a list of lines, pages, words, memory locations, blocks or sets of memory locations to possibly undergo a write back operation. Additional information is provided in conjunction with FIG. 3A, below.

Figure 2:
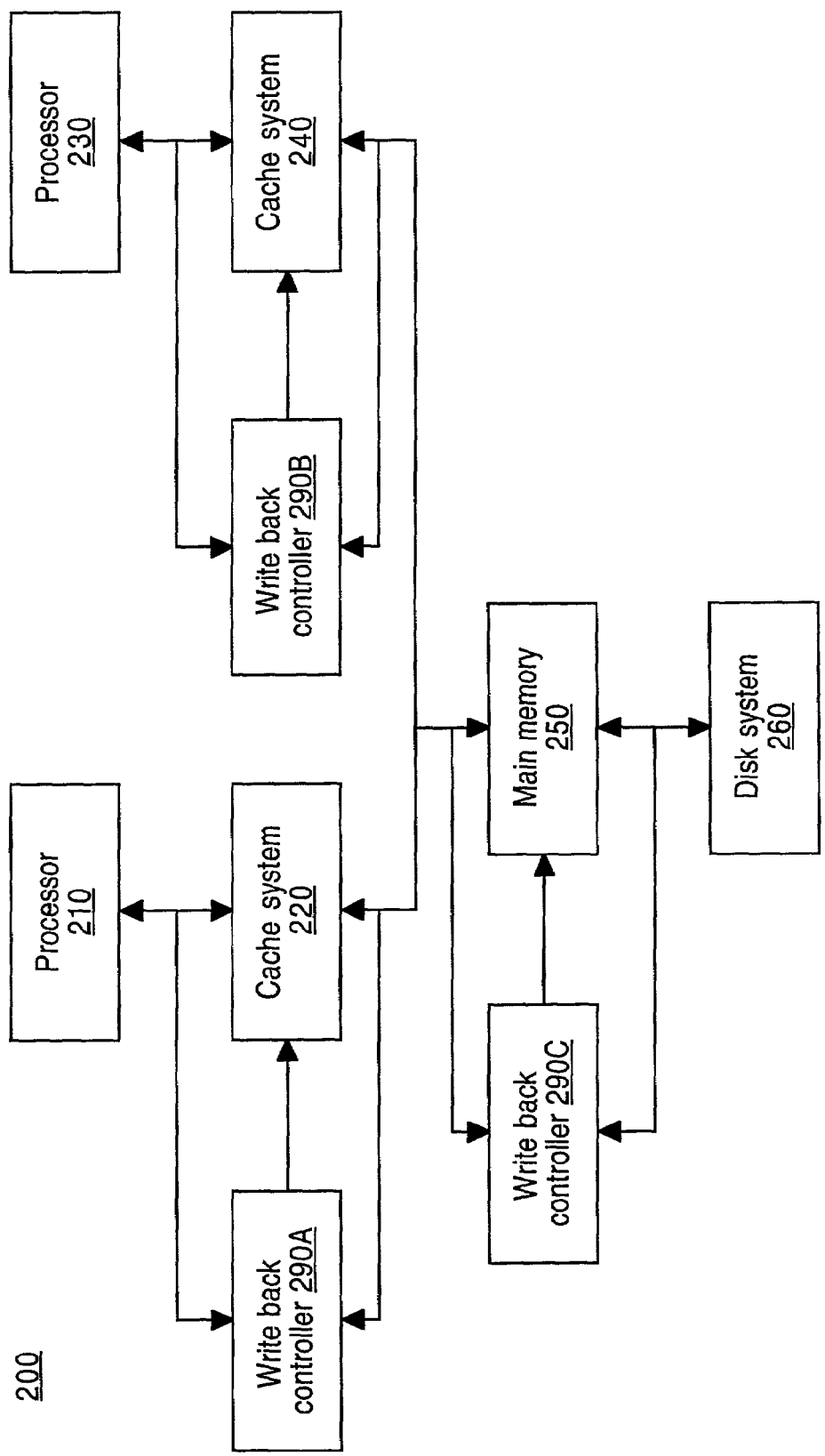
FIG. 2 is a block diagram of a second computer system, showing a write back controller in accordance with one embodiment of the present invention.

FIG. 2 illustrates a second computer system 200, showing write back controller 290A, 290B and 290C in accordance with one embodiment of the present invention. The second computer system 200 includes a first processor 210, a first cache system 220, a second processor 230, a second cache system 240, a main memory 250, and a disk system 260, coupled using one or more buses. Each cache system 220 and 240 can be a multiple-level cache system having a plurality of cache levels such as a level 1 cache, a level 2 cache, a level 3 cache, etc. Alternatively, each cache system 220 and 240 can be a single-level cache system having a cache. It will be understood that the second computer system 200 can be configured in any other manner. Although the present invention is described in the context of cache systems 220 and 240 and main memory 250, the present invention is well suited for use with other temporarily private data storages that implement a write back strategy. The present invention is also well suited for use with a write through strategy, as long as at least one of the memories coupled to a write back controller utilizes a write back strategy.

Moreover, it should be understood that the first and second processors 210 and 230 can share any memory system including, for example, a level 1 cache, a level 2 cache, a level 3 cache, a main memory, or a permanent storage. Alternatively, the processors could each reside in separate computer systems that share temporarily private data with other processors over a computer network. In this case, the memory system shared by the processors is the memory system formed by the coupling of each of the processors with their associated computer systems over a computer network.

Furthermore, it is appreciated that the memory systems of computer system 200 may be implemented as a distributed memory system. Also, it is appreciated that multiple write back controllers are not necessarily needed at the same memory level. That is, for example, if write back controller 290A serves one memory level, there is not a need for write back controller 290B at the same memory level.

In the present embodiment, the second computer system 200 includes a first write back controller 290A coupled to the cache system 220, a second write back controller 290B coupled to the cache system 240, and a third write back controller 290C coupled to the main memory 250. Each write back controller is designed and optimized for operation with the respective memory. It will be understood that, for a multiple level cache system, second computer system 200 can have a write back controller for each cache level.

In the present embodiment, a level 1 cache writes back to a level 2 cache, the level 2 cache writes back to the main memory 250, and the main memory 250 writes back to the disk system 260. In an embodiment in which cache system 220 and/or cache system 240 include additional levels of cache, the level 2 cache can write back to a level 3 cache, the level 3 cache can write back to another level of cache, and so on, with the final level of cache writing back to the main memory 250. In an alternate embodiment, any level of a cache system or main memory 250 or other temporarily private data storage may utilize a write through strategy, as long as at least one of the memories coupled to a write back controller utilizes a write back strategy. In another embodiment, cache system 220 and/or cache system 240 can simply write back to the main memory 250. It should be understood that a write back controller does not have to be implemented with all the memories of the computer system. Moreover, each processor can bypass its respective cache system and interact directly with the main memory 250 or any other memory system.

The write back controllers 290A, 290B and 290C preemptively initiate the cleaning of each cache system 220 and 240 and the main memory 250 in advance of the immediate requirement to do so (e.g., in advance of a synchronization operation, a checkpointing operation, a context switch, a page fault or page replacement, etc.). In various embodiments, write back controllers 290A, 290B and 290C utilize a list of lines, pages, words, memory locations, blocks or sets of memory locations to possibly undergo this write back operation.

Figure 3A:
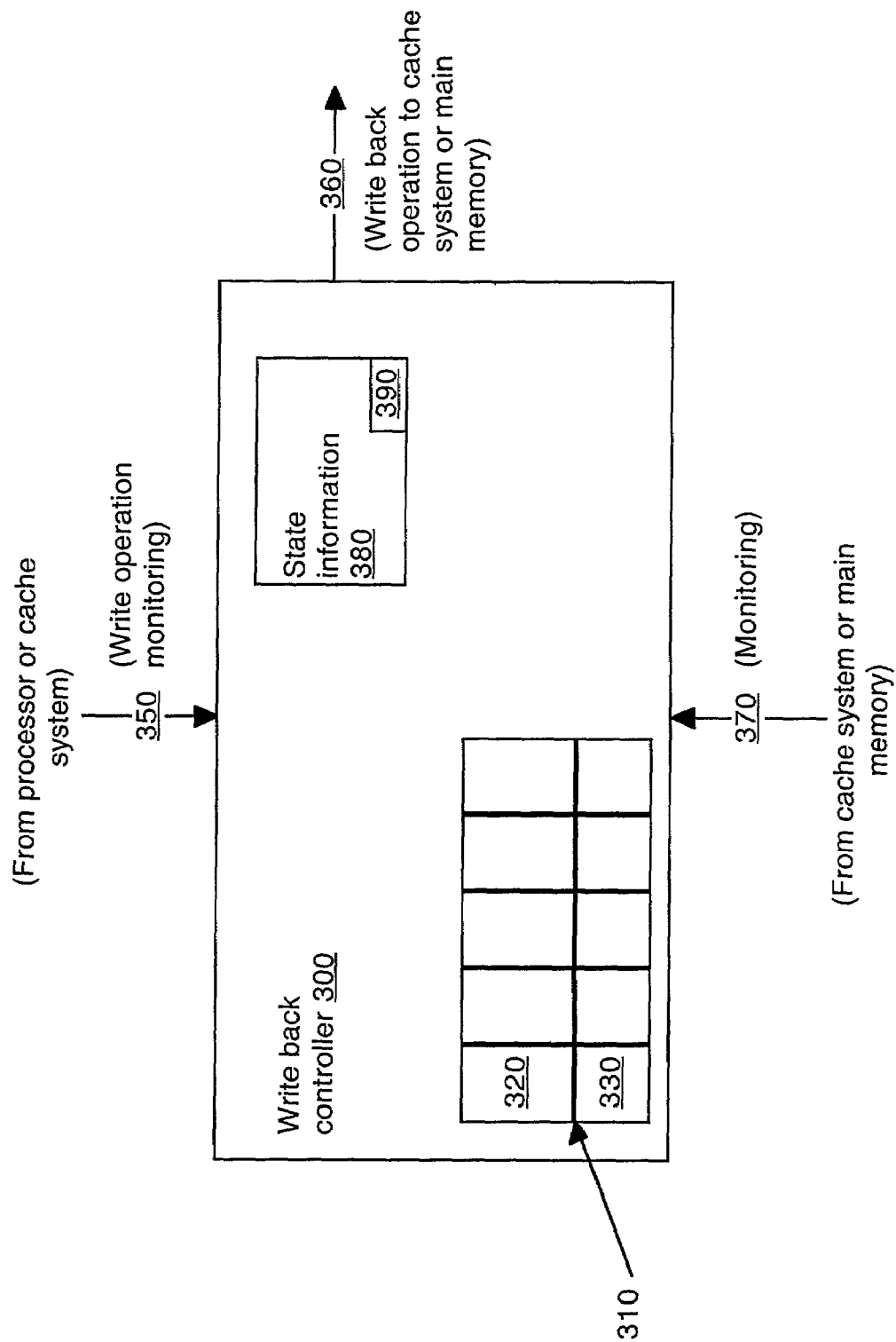
FIG. 3A illustrates a write back controller in accordance with one embodiment of the present invention.

FIG. 3A illustrates a write back controller 300 in accordance with one embodiment of the present invention. Write back controller 300 can be implemented in hardware, software, or any combination thereof. In the various embodiments of the present invention, write back controller 300 can identify those lines, pages, words, memory locations, blocks or sets of memory locations that experienced a write operation into them (for brevity, these are referred to herein as "write back memory location candidates"). Write back controller 300 can initiate or force a preemptive cleaning of these write back memory location candidates, in advance of a synchronization operation, a checkpointing operation, a context switch, a page fault or page replacement, etc. Accordingly, dirty lines, pages, words, memory locations, blocks or sets of memory locations can be cleaned at times when the cache, the main memory, other temporarily private data storage, the bus, etc., are being less heavily utilized. As such, cleaning of cache, main memory, or other temporarily private data storage will be at least partially completed in advance of an immediate requirement to clean. Thus, cleaning operations can proceed more quickly.

In addition, cleaning operations will have less of an impact on the computer system's resources. For example, bandwidth saturation, bottlenecks on the bus, and latency and stalling of execution of instructions can be reduced or eliminated. Moreover, bus(es), processor(s), memory system controller(s), etc., can operate at more optimal levels of utilization rather than at high levels of utilization. Generally, avoiding a high level of utilization of the write back controller is not as much a concern as it may be for other portions of the computer system. Thus, memory cleaning can be done during times when the bus and other hardware involved are idle or less fully utilized. This can result in better-distributed demand for and utilization of the buses and other portions of the computer system, as well as a more uniform memory access pattern in time. Furthermore, write back controller 300 can reduce power peaking and lower power consumption because it can distribute more evenly in time the process of conducting write backs, and because it can provide faster and more efficient cleaning or flushing when such operations are performed.

In the case of a checkpointing operation, write back controller 300 is well suited for situations in which the productivity of a processor is affected while the checkpoint is being performed. In the case of a context switch, write back controller 300 is well suited for situations in which a cache is flushed during the context switch. Examples of where a cache may be flushed during a context switch include situations in which the cache is physically indexed or in which the cache is virtually indexed but the cache does not have a process identifier stored with the tag in the cache.

In the case of a page fault or page replacement, write back controller 300 is well suited for situations in which a page is replaced in memory, leading to activity (e.g., cleaning, flushing, etc.) in the cache and/or main memory. In the case of a synchronization operation, write back controller 300 may be well suited for situations in which a processor has few write buffers.

As mentioned above, write back controller 300 can identify write back memory location candidates (e.g., those lines, pages, words, memory locations, blocks or sets of memory locations which experienced a write operation into them). In the present embodiment, write back controller 300 includes a list 310 of the lines, pages, words, memory locations, blocks or sets of memory locations potentially requiring a write back in a write back cache, write back main memory, or other write back temporarily private data storage.

In one embodiment, list 310 includes a plurality of pointers 320. In this embodiment, each pointer 320 represents a write back memory location candidate in a respective memory (e.g., one of the caches, the main memory, etc.; refer to FIGS. 1 and 2). Write back controller 300 can thus reduce power peaking and lower power consumption because it can distribute more evenly in time the process of conducting write backs, because it can provide faster and more efficient cleaning or flushing when such operations are performed, and because it can remove the necessity of checking all memory locations for data requiring cleaning.

Continuing with reference to FIG. 3A, in the present embodiment, a pointer 320 is added to or stored in the list 310 when a write operation is performed to the memory (e.g., a cache, main memory, or other temporarily private data storage) corresponding to write back controller 300. Write back controller 300, via connection 350, can monitor whether a write operation is performed to the respective memory. If a write operation is detected, write back controller 300 forms a pointer 320 in the list 310 to point to the write address associated with the write operation.

In the present embodiment, write back controller 300 causes a memory to perform a write back operation by selecting one of the plurality of pointers 320 and then providing, via connection 360, a write back operation indication and the selected write back memory location candidate to the corresponding memory. The determination of when to begin a write back operation, and at what pace to conduct this operation, are design choices. Different algorithms or mechanisms can be used with write back controller 300 to trigger a write back operation. It should be appreciated that the memory need not perform the write back operation if, for example, the selected write back memory location candidate has been marked invalid, has already been cleaned, or has previously been evicted.

In the present embodiment, a pointer 320 is deleted or invalidated from list 310, and its associated write back memory location candidate ceases to be a candidate unless pointed to by another pointer in list 310 or in another list, when write back controller 300 selects that pointer from the list 310 and provides a write back operation indication and the selected write back memory location candidate to the corresponding memory via connection 360. In another embodiment, write back controller 300 communicates with a separate system (e.g., a processor, another memory controller, etc.) to initiate the write back operation in the memory. In yet another embodiment, write back controller 300 monitors activity of the corresponding memory via connection 370, to detect eviction of lines, pages, words, memory locations, blocks or sets of memory locations or other relevant activity on memory locations, in order to delete or invalidate the corresponding pointer 320 from the list 310, in which case the associated write back memory location candidate ceases to be a candidate unless pointed to by another pointer in list 310 or in another list.

In one embodiment, the list 310 includes state data 330 corresponding to each pointer 320. Examples of state data 330 include a tag, frequency data, least recently used (LRU) data, a valid/invalid bit, a timestamp, and way identification data (if the cache system is a multiple way associative cache system). The frequency data can represent how frequently a memory location has been accessed, written to, or read. In one embodiment, write back controller 300 selects one of the plurality of pointers 320 based on a tag, frequency data, LRU data, an valid/invalid bit, a timestamp, etc. However, in another embodiment, write back controller 300 selects one of the plurality of pointers 320 without regard to the state data 330. Alternatively, write back controller 300 can randomly select one of the plurality of pointers 320.

In one embodiment, to manage the list 310, write back controller 300 includes a head pointer and a tail pointer, a tail pointer only, or a head pointer only. Alternatively, the invalid/valid bit is utilized to manage the pointers 320. Moreover, other methods, such as linked lists, can be used to keep track of the pointers 320.

Additionally, write back controller 300 can use hashing to provide faster access to the list 310 and thereby augment the performance of write back controller 300. By using hashing, write back controller 300 can quickly determine whether a specific pointer already exists in the list 310, in order to avoid creating a duplicate pointer. Moreover, hashing can be used in conjunction with the invalid/valid bit.

In one embodiment, list 310 is reset on the occurrence of any event that will force the cleaning or flushing of the entire memory system. Examples of these events may include a checkpointing operation, a context switch, and a page fault or page replacement. The list 310 can be reset by resetting the valid/invalid bit of the state data 330 corresponding to each pointer 320. Alternatively, the tail pointer or head pointer can be reset. Various other methods can also be used to reset the list 310.

The size of the list 310 is a design choice. If the list 310 is filled, write back controller 300 can follow one or more of several courses of action. For instance, write back controller 300 can provide, via connection 360, a high priority write back indication and the selected write back memory location candidate to the corresponding memory. Alternatively, write back controller 300 can extend the list 310 by finding additional memory capacity. Also, write back controller 300 can simply fail to add another pointer 320 to the list 310 until existing pointers have been removed from the list 310. Additionally, write back controller 300 can overwrite a randomly selected or specifically selected pointer and its associated state information with the data of the new pointer and its associated state information. Concurrently with any of the above processes, the state data 330 associated with each pointer 320 may be updated, accessed, or invalidated. This can be done dependently or independently of the updates, accesses, or invalidations of the pointers 320.

In one embodiment, write back controller 300 has a plurality of state data 380 associated with the operation of the write back controller 300. In one such embodiment, state data 380 includes a flag 390 for indicating the status of list 310. Recall that each pointer 320 in list 310 represents a write back memory location candidate. As described in the preceding paragraph, depending on the course of action taken, in some instances a pointer 320 may not be added to list 310, or a pointer 320 may be overwritten, or the like. In these instances, list 310 may not include a pointer 320 for each write back memory location candidate. The flag 390 in state data 380 is used to indicate whether list 310 does have or does not have a pointer 320 for each write back memory location candidate.

Depending on which course of action is taken, on whether a flag 390 is used or not, and on what indication is provided by flag 390 when a flag 390 is used, write back controller can use list 310 (knowing from flag 390 that list 310 includes a pointer 320 for each write back memory location candidate), or use list 310 and scan memory locations for data requiring cleaning (knowing that list 310 does not include a pointer 320 for each write back memory location candidate), or scan memory locations for data requiring cleaning without using list 310. This is summarized by FIG. 3B. In one embodiment, flag 390 is used in the checkpoint phase of a checkpoint cycle (refer to FIG. 4A, below) to determine whether list 310 can be used exclusively, whether memory locations should be scanned for data requiring cleaning in conjunction with the use of list 310, or whether memory locations should be scanned for data requiring cleaning without the use of list 310. At the end of the checkpoint phase, flag 390 is reset to an initial value. Thus, in summary, in various embodiments, list 310 drives either a full or partial cleaning or flushing of the write back cache with which write back controller 300 is associated.

Checkpointing

Figure 4A:
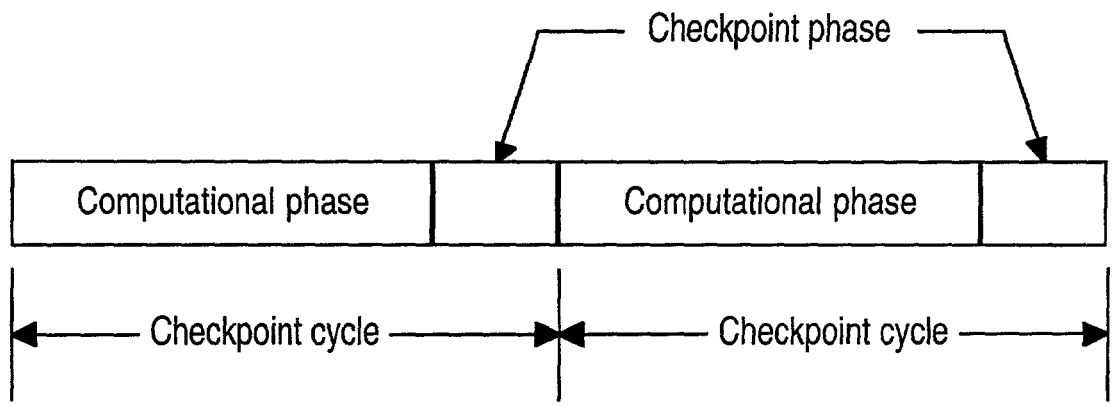
FIGS. 4A and 4B illustrate the various phases of a checkpoint system according to one embodiment of the present invention.
Figure 4B:
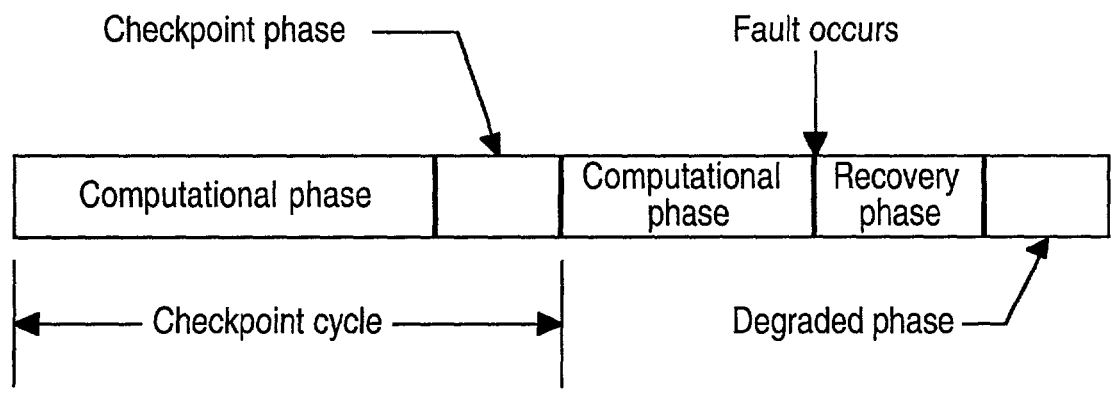

FIGS. 4A and 4B illustrate the various phases of a checkpoint process according to one embodiment of the present invention. The process of checkpointing allows a computer system to backtrack to a state that existed prior to a fault. In the present embodiment, there are four phases to a checkpoint system; these phases are referred to herein as the computational phase, the checkpoint phase, the recovery phase, and the degraded phase. The computational phase and the checkpoint phase make up what is referred to herein as a checkpoint cycle.

FIG. 4A illustrates the computational phase and the checkpoint phase according to the present embodiment of the present invention. In this embodiment, during a computational phase, maintenance is performed in the background in order to provide the data needed for system recovery in the event of a fault. In the present embodiment, during the checkpoint phase, the computer system is brought to a known state that can be recreated as a starting point in the event of a fault. In this state, caches (and other temporarily private data storage) are cleaned, and the internal state of the processing nodes is also brought to a known state and recorded.

FIG. 4B illustrates the recovery phase and the degraded phase according to the present embodiment of the present invention. The recovery phase and the degraded phase occur following the detection of a fault. Although FIG. 4B shows the fault occurring during the computational phase, the present invention is also applicable should a fault occur during the checkpoint phase.

As an overview, the various embodiments of the present invention are used for making and storing a copy of the state of a computer system at the time of completion of a checkpoint cycle (typically, the latest checkpoint cycle). In one embodiment, this is achieved by saving the checkpointed state in a fault-tolerant memory. In one such embodiment, each time a line is written back to main memory, the contents of the main memory that were displaced by that line are recorded in a buffer, referred to as an undo FIFO (first in, first out) buffer. If the main memory has a number of different nodes, a separate undo FIFO buffer can be kept for each memory node.

If a fault occurs, the state of the computer system can be restored to the checkpointed state by reading out the undo FIFO buffer and rewriting main memory using the contents of the undo FIFO buffer. The internal state of processing nodes can be similarly restored. In the present embodiment, if a fault does not occur during a checkpoint cycle, the contents of the undo FIFO buffer are dumped "atomically" at the end of the cycle.

"Atomically" is used to denote a single logically-indivisible operation that wipes out the entire contents of, for example, a buffer or buffers. That is, in alternate embodiments, the undo FIFO buffer may not be a single memory but may instead be a distributed memory system, or there may be more than one undo FIFO buffer. It is preferable to dump all undo FIFO buffers at the same time (e.g., in the same cycle). In a case in which more than one cycle is used to dump all undo FIFO buffers, then it is preferable to give the appearance of atomicity. In this latter case, data structures and algorithms can be implemented so that, if a fault occurs during the dump, the computer system can either roll back using a full undo FIFO buffer or roll back using no contents of the undo FIFO buffer(s); that is, an undo FIFO buffer in an intermediate state (e.g., in the processing of dumping) will not be used, or will be treated as having no contents.

Figure 5:
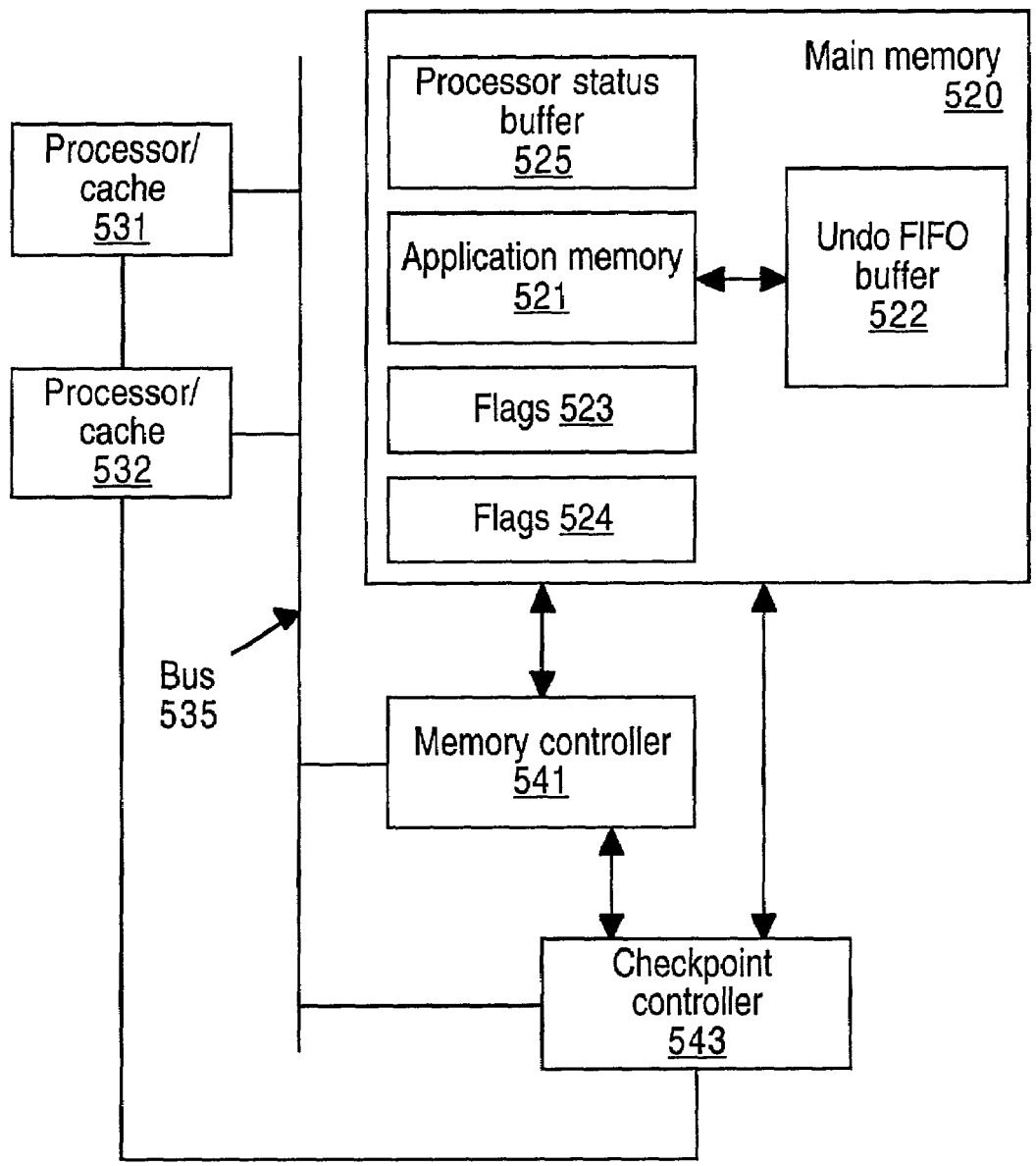
FIG. 5 is a block diagram of a computer system, showing a checkpoint controller according to one embodiment of the present invention.

FIG. 5 is a block diagram of a computer system 510, showing a checkpoint controller 543 according to one embodiment of the present invention. In this embodiment, computer system 510 has multiple processor nodes 531 and 532 coupled to a main memory 520 by bus 535; however, it is appreciated that the present invention can be implemented in computer systems having a single processor node or having more than two processor nodes. Here, a "processor node" represents some combination of processor and/or cache (e.g., a processor alone, a processor coupled to a cache, etc.).

In the present embodiment, main memory 520 includes a processor status buffer 525, an application memory 521, flags 523 and 524, and an undo FIFO buffer 522. For simplicity of discussion and illustration, FIG. 5 only shows cache write back to main memory 520; however, as explained above (FIGS. 1 and 2), there may be multiple levels of memory. It is appreciated that the memory systems of computer system 510 may be implemented as a distributed memory system.

In the present embodiment, main memory 520 is under the control of a memory controller 541. According to the present embodiment, the timing of checkpoint cycles is controlled using a checkpoint controller 543. In another embodiment, checkpoint controller 543 is integrated with memory controller 541.

According to the present embodiment, main memory 520 is read and written in units of cache lines, although it is appreciated that memory can be in units of pages, words, memory locations, blocks or sets of memory locations. Each cache line has appended thereto error-correcting bits that can be used by memory controller 541 to detect and correct errors in the cache line. Error correcting techniques of this type are known in the art. In general, these techniques recognize that a small number of cache lines is possible if no errors are introduced during a storage and retrieval process. For example, in a typical error correcting code, each eight-bit data word is transformed into a 16-bit storage word. There are 256 possible data word values; hence, only 256 of the possible 65,536 storage word values will be used in the absence of errors. Should an error occur, a valid storage word is usually converted to an invalid storage word. The error correcting technique will then attempt to determine which valid state would have given rise to the detected invalid state if various number of bits were altered by the storage operation.

In the present embodiment, application memory 521 is used to store the actual cache lines that are delivered to the processor nodes 531 and 532 and to undo FIFO buffer 522. In one embodiment, each time a cache line is written back into application memory 521, the line displaced by this write back is copied into undo FIFO buffer 522. In this embodiment, at the end of each checkpoint cycle, the state of each of the processors in processor nodes 531 and 532 is written into a location in processor status buffer 525. The data in processor status buffer 525 includes the state information (e.g., flags, registers and other types and instances of state information) within processor nodes 531 and 532. In addition, at the end of each checkpoint cycle, processor nodes 531 and 532 write back any dirty cache lines to main memory 520.

Each time a cache line is written back to main memory 520, it displaces the contents of one of the lines in application memory 521. In one embodiment, the displaced cache line is written to undo FIFO buffer 522. In this embodiment, if no faults have been detected at the completion of a checkpoint cycle (at the end of a checkpoint phase), the contents of undo FIFO buffer 522 are atomically dumped.

If a fault is detected, the contents of undo FIFO buffer 522 can be written back to application memory 521 during the fault recovery phase, thereby returning application memory 521 to the state it was in at the end of the latest checkpoint cycle. Processors within processor nodes 531 and 532 can also be reloaded from processor status buffer 525.

According to the present embodiment of the present invention, checkpoint controller 543 defines and implements the repeating checkpoint cycles. Using any of a variety of methods including direct or indirect access methods, checkpoint controller 543 has access to the state information in each of the processor nodes 531 and 532 (that is, flags, registers, and other information that defines the state of each processor node). Memory controller 541 receives a cache line from a processor node specifying an address in application memory 521 at which the cache line is to be stored. A copy of the cache line currently residing at the specified address is copied into undo FIFO buffer 522. The cache line received in response to the write command can then overwrite the cache line at the specified address.

In the present embodiment, at a predetermined point in each checkpoint cycle, checkpoint controller 543 causes the processor nodes 531 and 532 to cease processing instructions for the computational phase and begin maintenance operations for the checkpoint phase, saving state information (e.g., flags, registers and other types and instances of state information) at the end of the computational phase such that computations can be restarted from that point. Checkpoint controller 543 also causes the processor nodes 531 and 532 to store their state information (e.g., flags, registers and other types and instances of state information) in status buffer 525, and to write back to main memory 520 all dirty cache lines. In one embodiment, checkpoint controller 543 atomically empties undo FIFO buffer 522 at the end of each checkpoint cycle if no fault has been detected during the checkpoint cycle.

The size of undo FIFO buffer 522 is a design choice that is a function of the length of a checkpoint cycle; a longer checkpoint cycle will generally require a larger undo FIFO buffer, because it is desirable that undo FIFO buffer be capable of storing all displaced cache lines during a single checkpoint cycle. However, shorter checkpoint cycles can reduce the overall efficiency of a computer system.

In one embodiment, to prevent overflow of undo FIFO buffer 522, checkpoint controller 543 can monitor the free space in that buffer, and initiate a new checkpoint cycle if the free space falls below a specified threshold. It is appreciated that other conditions can be monitored and used to trigger a new checkpoint cycle. These conditions include, but are not limited to, the number of processor cycles, number of bus cycles, the number of cycles performed by another component of the computer system, the number of transactions performed by a component of the computer system, the number of instructions executed by a component of the computer system, the number of write back operations, an internal signal such as a hardware timer interrupt, or an external signal.

In one embodiment, the size of undo FIFO buffer 522 is reduced by monitoring which cache lines have been copied in the buffer. For example, consider the case in which a cache line at a particular address is written back to application memory 521 several times during a single checkpoint cycle. The only copy of the cache line that is of significance is the one that was displaced by the first write back, as this is the one that will be used to restore the computer system in the event of a fault. Any subsequent lines for this address will be overwritten when recovering from a fault.

In one embodiment, a flag 523 is assigned to each cache line in application memory 521. In this embodiment, at the beginning of a checkpoint cycle, the flags are set to a first value to indicate that a write back has not occurred for their respective cache lines. When a cache line is written back, the flag 523 for that line is examined to determine if a write back for that line has already occurred. If a write back of that cache line has not occurred, the cache line displaced by the write back is copied into undo FIFO buffer 522, and the flag 523 is set to a second value to indicate that a write back has now occurred. If a write back of that cache line has previously occurred, the displaced cache line is disregarded, as the copy of that cache line needed for fault recovery is already in undo FIFO buffer 522.

In the present embodiment, at the transition from one checkpoint cycle to the next, the flags 523 for each cache line are reset to the first value. To reduce the time needed to reset the flags, in one embodiment, two sets of flags 523 and 524 are used. Each flag has one bit for each cache line in application memory 521. The flags alternate between a first value and a second value. During a checkpoint cycle, one set of flags (e.g., flags 523) is used to keep track of which cache lines have been written back to undo FIFO buffer 522, as explained above. The other set of flags (e.g., flags 524) is reset in the background. In the next checkpoint cycle, the set of flags that was not used in the preceding checkpoint cycle (e.g., flags 524) is used to keep track of which cache lines have been written back to undo FIFO buffer 522, while the other set of flags (e.g., flags 523) is reset in the background.

As noted above, according to the various embodiments of the present invention, the memories (caches, registers, etc.) in processor nodes 531 and 532 are synchronized with main memory 520 at the end of each checkpoint cycle. In one embodiment, to prevent saturation of bus 535 during this write back activity, memory controller 541 tracks the lines within main memory 520 that are to receive a write back for the current checkpoint cycle. For example, if a processor node requests an exclusive copy of a cache line from main memory 520, memory controller 541 recognizes that a write back for that cache line may occur before the end of the current checkpoint cycle. Should that write back occur, and if a write back of that cache line had not previously occurred, the cache line displaced by the write back would be copied into undo FIFO buffer 522 as described above. In the present embodiment, memory controller 541 does not wait for the write back to occur before copying the cache line currently in application memory 521 to undo FIFO buffer 522. Instead, memory controller 541 copies that cache line into undo FIFO buffer 522 beforehand, thereby distributing the write backs over the checkpoint cycle. That is, some portion of the write backs will occur during the computational phase, thus reducing the load during the checkpoint phase.

The above-described embodiments utilize fault-tolerant memory. However, in other embodiments, conventional memory can be used, although such embodiments may not recover from memory errors. Also, while the above-described embodiments have utilized conventional memory for the shared memory, embodiments of the present invention can be utilized with other forms of memory including disk drives and the like. Embodiments in which the undo FIFO buffer 522 and/or flag buffers 523 and 524 are in separate memories can also be practiced in accordance with the present invention.

Also, the above-described embodiments utilize a scheme in which memory is read and written in blocks consisting of cache lines; however, it is appreciated that embodiments of the present invention can be implemented using other types of storage blocks.

As described above, embodiments of the present invention store the state of the computer system at the end of each checkpoint cycle. In some hardware configurations such as wave pipelined processors, the status of the computer system may not always be available in the state information (e.g., flags, registers and other types and instances of state information) that can be accessed by checkpoint controller 543. In such configurations, the checkpoint data on the status are taken when the data are available. Hence, the end of the checkpoint cycle may include the insertion of "no-ops" to flush the pipeline prior to reading the state information (e.g., flags, registers and other types and instances of state information), so that the computer system is in a known state that is checkpointed as described herein.

In the above-described embodiments of the present invention, the computer system is restarted from the checkpoint data after the detection of a fault. However, the computer system can instead be reconfigured prior to restart. For example, faulty hardware can be eliminated provided the remaining hardware is sufficient to run the program in question.

While embodiments of the present invention utilize hardware interrupts to initiate a checkpoint cycle, software interrupts may also be utilized. Hence, the term "interrupt" is used herein to include hardware and/or software interrupts unless indicated otherwise.

Checkpointing with a Write Back Controller

Figure 6:
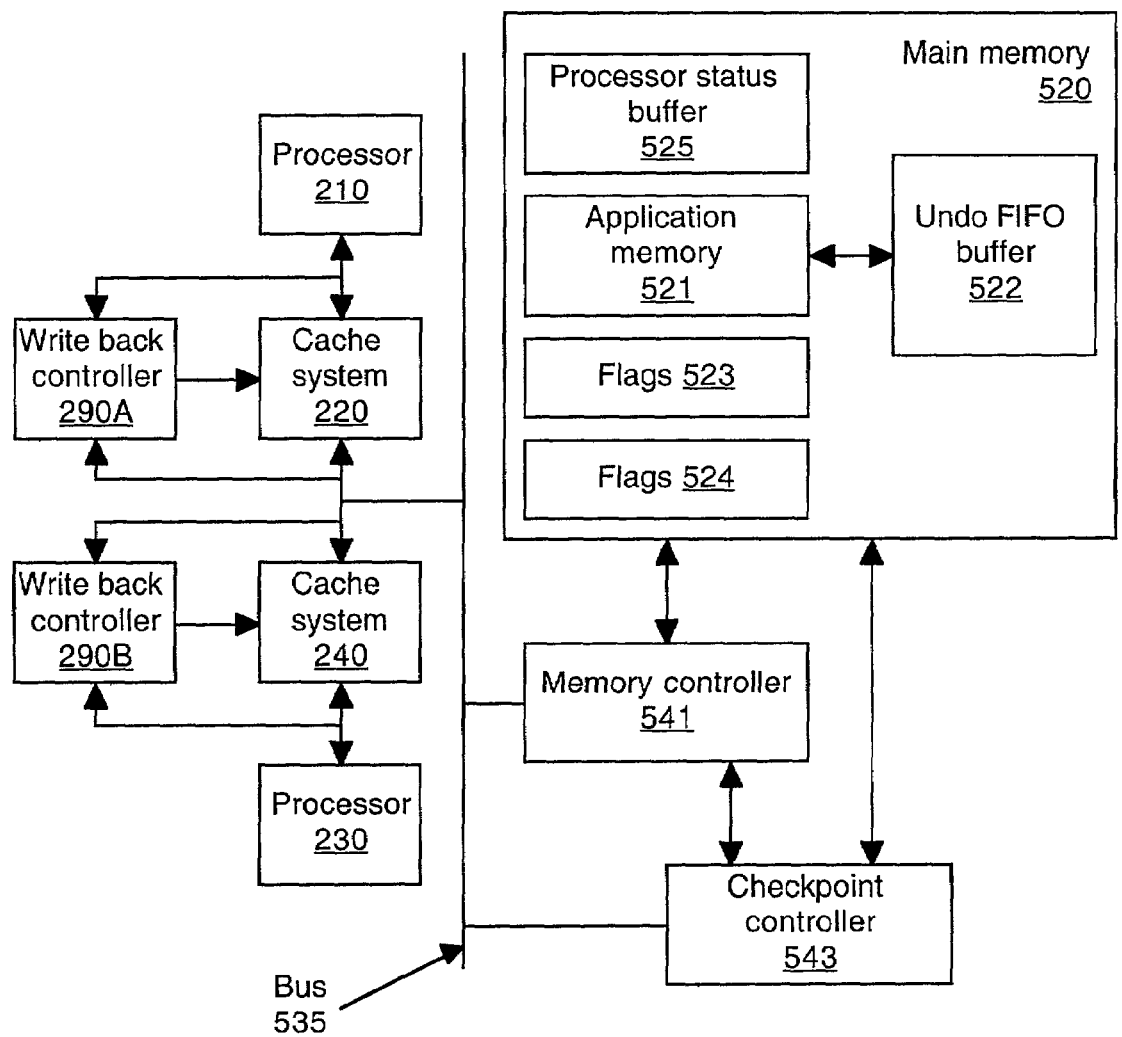
FIG. 6 is a block diagram of a computer system, showing a write back controller and a checkpoint controller according to one embodiment of the present invention.

FIG. 6 is a block diagram of a computer system 610, showing write back controllers 290A and 290B and checkpoint controller 543 according to one embodiment of the present invention. The functionality of write back controllers 290A and 290B is discussed above in conjunction with FIG. 2. The functionality of checkpoint controller 543 is discussed above in conjunction with FIG. 5. The other elements of FIG. 6 are as described previously herein (refer to FIGS. 2 and 5). Although write back controllers 290A and 290B, checkpoint controller 543, and memory controller 541 are shown as separate elements in FIG. 6, it is understood that all of these elements, or any combination of these elements, may be integrated as a single element. In addition, in the present embodiment, the term "processor node" can be used to represent some combination of processor and/or cache and/or write back controller. Also, although two processors 210 and 230 are shown in FIG. 6, it is appreciated that embodiments of the present invention may be utilized with more or less than two processors.

The embodiments of the present invention incorporating a write back controller and a checkpoint controller, as exemplified by FIG. 6, preemptively force write backs before the start of the checkpoint phase. In general, according to one embodiment, write back controllers 290A and 290B will cause dirty data that would not otherwise be written back from cache systems 220 and 240 to main memory 520 before the checkpoint phase, to instead be written back in advance of the checkpoint phase (e.g., during the computational phase). In other embodiments, this may be accomplished using a memory controller 541 or a checkpoint controller 543 that incorporates the functionality of write back controllers 290A and 290B.

A comparison of computer system 610 of FIG. 6 to computer system 510 of FIG. 5 shows that computer system 610 includes one or more write back controllers 290A and 290B. Accordingly, in computer system 610, more of the cache lines in cache systems 220 and 240 will be clean when the checkpoint phase is undertaken, relative to computer system 510. Accordingly, the peak bandwidth requirements of the checkpointing process are reduced, and bus saturation is diminished. Also, the checkpointing process will take less time to complete, because fewer write backs will be needed during the checkpoint phase.

Figure 7:
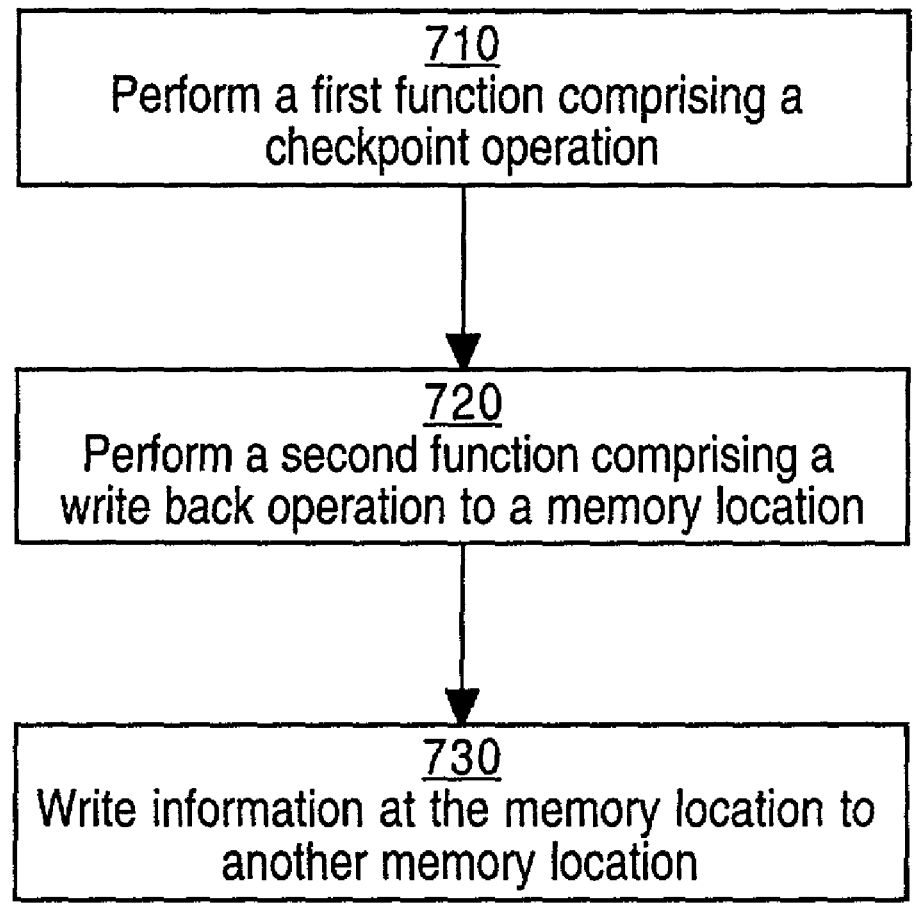
FIG. 7 is a flowchart of a checkpointing method using a write back controller according to one embodiment of the present invention.

FIG. 7 is a flowchart 700 of a checkpointing method using a write back controller according to one embodiment of the present invention. Flowchart 700 includes processes of the present invention that, in one embodiment, are carried out by a processor under the control of computer-readable and computer-executable instructions. The computer-readable and computer-executable instructions reside, for example, in a computer usable medium such as computer usable volatile memory, computer usable non-volatile memory, or a data storage device, including removable devices and elements such as optical or magnetic disks. Although specific steps are disclosed in flowchart 700, such steps are exemplary. That is, embodiments of the present invention are well suited to performing various other steps or variations of the steps recited in flowchart 700. It is appreciated that the steps in flowchart 700 may be performed in an order different than presented, and that not all of the steps in flowchart 700 may be performed.

In step 710, in the present embodiment, a first function comprising a portion of a checkpoint operation is performed. In one embodiment, the checkpoint operation includes a series of contiguous checkpoint cycles such as those illustrated by FIG. 4A. In one embodiment, the first function is performed under the direction of checkpoint controller 543 of FIG. 6.

In one embodiment, the first function includes writing back dirty cache entries from a first memory location to a second memory location (e.g., from cache system 220 and/or cache system 240 to application memory 521 of FIG. 6). In the present embodiment, this write back occurs at a predetermined time in the checkpoint cycle, typically during a checkpoint phase.

In one embodiment, upon the completion of a checkpoint cycle, the memory (undo FIFO buffer 522) that includes the third memory location is emptied. In another embodiment, the free space in this memory (undo FIFO buffer 522) is monitored, and if the free space does not satisfy a specified threshold, then a new checkpoint cycle is initiated.

In one embodiment, the first function includes storing state information (e.g., flags, registers and other types and instances of state information) for a processor or processors in a fourth memory location (e.g., in processor status buffer 525).

In step 720 of FIG. 7, in one embodiment, a second function comprising a write back operation is performed. In one embodiment, the second function includes writing back dirty cache entries from a first memory location to a second memory location (e.g., from cache system 220 and/or cache system 240 to application memory 521 of FIG. 6). In the present embodiment, this write back occurs before the end of a checkpoint cycle (before the checkpoint phase). In one embodiment, the write back operation is performed under the direction of write back controller 290A (and/or 290B) of FIG. 6.

In one embodiment, the second function includes identifying write back memory location candidates for the write back operation. In one such embodiment, a list that includes a plurality of pointers is generated and maintained. Each pointer represents a candidate for the write back operation. The write back operation can be initiated by selecting one of the pointers.

Although the first function is described as being executed using a first controller (e.g., checkpoint controller 543 of FIG. 6) and the second function is described as being executed using a second controller (e.g., write back controller 290A and/or 290B of FIG. 6), it is appreciated that the first and second functions can be executed using a single controller that provides both functionalities.

In step 730 of FIG. 7, according to one embodiment, information already in the second memory location (e.g., in application memory 521 of FIG. 6) is selectively written to a third memory location (e.g., in undo FIFO buffer 522 of FIG. 6). In another embodiment, a cache line is written to a third memory location if a write back of that cache line has not previously occurred. In one embodiment, step 730 is performed under the direction of memory controller 541 of FIG. 6.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A computer system comprising:
a first controller for implementing a first function, wherein said first function comprises part of a checkpoint operation and wherein said checkpoint operation comprises a series of contiguous checkpoint cycles; and
a second controller coupled to said first controller, said second controller for implementing a second function, wherein said second function comprises a write back operation from a first memory location to a second memory location and wherein said write back operation occurs before a checkpoint cycle ends, wherein said second controller maintains a flag associated with a list comprising a plurality of pointers, each pointer representing a candidate for said write back operation, said flag for indicating whether said list includes a pointer for each candidate for said write back operation;
wherein information already at said second memory location is selectively written back to a third memory location.

2. The computer system of claim 1 comprising a processor node coupled to said first controller, wherein said first controller has access to state information in said processor node.

3. The computer system of claim 1 comprising multiple processor nodes coupled to said first controller, wherein said first controller has access to state information in each of said processor nodes.

4. The computer system of claim 1 wherein said first controller causes a processor to write back dirty cache entries to said second memory location and to store state information for said processor in a fourth memory location.

5. The computer system of claim 1 wherein said first controller causes said third memory location to be emptied upon completion of a checkpoint cycle.

6. The computer system of claim 1 wherein said first controller monitors free space in a memory comprising said third memory location and initiates a new checkpoint cycle when said free space is below a specified threshold.

7. The computer system of claim 1 wherein said first controller monitors a condition and initiates a new checkpoint cycle when said condition is satisfied, wherein said condition is based on number of processor cycles, number of bus cycles, number of cycles performed by a component of said computer system, number of transactions performed by a component of said computer system, number of instructions executed by a component of said computer system, number of write back operations, an internal signal, or an external signal.

8. The computer system of claim 1 wherein said second controller identifies candidates for said write back operation.

9. The computer system of claim 1 wherein said write back operation is initiated by said second controller selecting one of said pointers.

10. The computer system of claim 1 wherein said write back operation occurs before a computational phase of said checkpoint cycle ends.

11. A checkpointing method comprising:
performing a first function comprising a checkpoint operation, wherein said checkpoint operation comprises a series of contiguous checkpoint cycles;
performing a second function comprising a write back operation, wherein said write back operation comprises a write back of information from a first memory location to a second memory location and wherein said write back operation is performed before a checkpoint cycle ends;
maintaining a list comprising a plurality of pointers, wherein each pointer represents a candidate for said write back operation;
setting a flag associated with said list, said flag for indicating whether said list includes a pointer for each candidate for said write back operation; and
writing information already at said second memory location to a third memory location.

12. The method of claim 11 comprising:
accessing state information for a processor node.

13. The method of claim 11 wherein said first function comprises:
storing state information for a processor node in a fourth memory location.

14. The method of claim 11 wherein said first function comprises:
writing back dirty cache entries at a processor node to said second memory location.

15. The method of claim 11 wherein said first function comprises:
emptying said third memory location upon completion of a checkpoint cycle.

16. The method of claim 11 wherein said write back operation occurs before a computational phase of said checkpoint cycle ends.

17. The method of claim 11 wherein said second function comprises:
identifying candidates for said write back operation.

18. The method of claim 11 wherein said second function comprises:
initiating said write back operation by selecting one of said pointers.

19. The method of claim 11 wherein said first function is executed using a first controller and said second function is executed using a second controller.

20. The method of claim 11 wherein said first function and said second function are executed using a single controller.

21. The method of claim 11 comprising:
monitoring free space in a memory comprising said third memory location; and
initiating a new checkpoint cycle when said free space is below a specified threshold.

22. The method of claim 11 comprising:
monitoring a condition; and
initiating a new checkpoint cycle when said condition is satisfied, wherein said condition is based on number of processor cycles, number of bus cycles, number of cycles performed by a component of said computer system, number of transactions performed by a component of said computer system, number of instructions executed by a component of said computer system, number of write back operations, an internal signal, or an external signal.

23. A computer-readable medium having computer-readable code stored thereon for causing a computer system to perform a checkpointing method comprising:
executing a first function comprising a checkpoint operation, wherein said checkpoint operation comprises a series of contiguous checkpoint cycles;
executing a second function comprising a write back operation, wherein said write back operation comprises a write back of information from a first memory location to a second memory location and wherein said write back operation is performed before a checkpoint cycle ends;

generating a list comprising a plurality of pointers, wherein each pointer represents a candidate for said write back operation;

associating a flag with said list;

setting said flag to a value to indicate whether said list includes a pointer for each candidate for said write back operation; and recording information already at said second memory location in a third memory location.

24. The computer-readable medium of claim 23 wherein said computer-readable program code embodied therein causes a computer system to perform a checkpointing method comprising:

reading state information for a processor node.

25. The computer-readable medium of claim 23 wherein said computer-readable program code embodied therein causes a computer system to perform a checkpointing method comprising:

writing back dirty cache entries at a processor node to said second memory location.

26. The computer-readable medium of claim 23 wherein said computer-readable program code embodied therein causes a computer system to perform a checkpointing method comprising:

recording state information for a processor node in a fourth memory location.

27. The computer-readable medium of claim 23 wherein said computer-readable program code embodied therein causes a computer system to perform a checkpointing method comprising:

emptying said third memory location upon completion of a checkpoint cycle.

28. The computer-readable medium of claim 23 wherein said write back operation occurs before a computational phase of said checkpoint cycle ends.

29. The computer-readable medium of claim 23 wherein said computer-readable program code embodied therein causes a computer system to perform a checkpointing method comprising:

identifying candidates for said write back operation.

30. The computer-readable medium of claim 23 wherein said computer-readable program code embodied therein causes a computer system to perform a checkpointing method comprising:

selecting one of said pointers to initiate said write back operation.

31. The computer-readable medium of claim 23 wherein said computer system comprises multiple processor nodes.

32. The computer-readable medium of claim 23 wherein said first function is executed using a first controller and said second function is executed using a second controller.

33. The computer-readable medium of claim 23 wherein said first function and said second function are executed using a single controller.

34. The computer-readable medium of claim 23 wherein said computer-readable program code embodied therein causes a computer system to perform a checkpointing method comprising:

completing a checkpoint cycle when free space in a memory comprising said third memory location is below a specified threshold.

35. The computer-readable medium of claim 23 wherein said computer-readable program code embodied therein causes a computer system to perform a checkpointing method comprising:

completing a checkpoint cycle when a condition is satisfied, wherein said condition is based on number of processor cycles, number of bus cycles, number of cycles performed by a component of said computer system, number of transactions performed by a component of said computer system, number of instructions executed by a component of said computer system, number of write back operations, an internal signal, or an external signal.

* * * * *

UNITED STATES PATENT AND TRADEMARK OFFICE
CERTIFICATE OF CORRECTION

| | | |
|---|---|---|
| PATENT NO. | : 7,085,955 B2 | Page 1 of 1 |
| APPLICATION NO. | : 10/106723 | |
| DATED | : August 1, 2006 | |
| INVENTOR(S) | : Manohar Karkal Prabhu | |

It is certified that error appears in the above-identified patent and that said Letters Patent is hereby corrected as shown below:

On the title page, item (75), in "Inventor", in column 1, line 1, delete "Pal Alto" and insert -- Palo Alto --, therefor.

Signed and Sealed this

Twenty-eighth Day of April, 2009

JOHN DOLL
*Acting Director of the United States Patent and Trademark Office*